(12) United States Patent
Murugesan et al.

(10) Patent No.: US 10,502,040 B1
(45) Date of Patent: Dec. 10, 2019

(54) UPCONVERTING NANOPARTICLES AS TRACERS FOR PRODUCTION AND WELL MONITORING

(71) Applicants: Sankaran Murugesan, Katy, TX (US); Valery Khabashesku, Houston, TX (US); Qusai Darugar, Houston, TX (US)

(72) Inventors: Sankaran Murugesan, Katy, TX (US); Valery Khabashesku, Houston, TX (US); Qusai Darugar, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/009,758

(22) Filed: Jun. 15, 2018

(51) Int. Cl.
| | |
|---|---|
| *E21B 43/14* | (2006.01) |
| *E21B 43/26* | (2006.01) |
| *E21B 47/10* | (2012.01) |
| *C09K 8/68* | (2006.01) |
| *C09K 11/02* | (2006.01) |
| *C09K 11/77* | (2006.01) |
| *E21B 43/20* | (2006.01) |
| *E21B 43/24* | (2006.01) |
| *C09K 8/66* | (2006.01) |

(52) U.S. Cl.
CPC ............. *E21B 43/14* (2013.01); *C09K 8/665* (2013.01); *C09K 8/68* (2013.01); *C09K 11/025* (2013.01); *C09K 11/7773* (2013.01); *E21B 43/20* (2013.01); *E21B 43/2406* (2013.01); *E21B 43/26* (2013.01); *E21B 47/1015* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 2013/0126158 A1 | 5/2013 | Gupta et al. | |
| 2015/0001385 A1 | 1/2015 | Perriat et al. | |
| 2016/0097750 A1* | 4/2016 | Van Herzen | G01N 31/22 166/250.12 |

(Continued)

FOREIGN PATENT DOCUMENTS

WO    2015092310 A1    6/2015

*Primary Examiner* — Anuradha Ahuja
(74) *Attorney, Agent, or Firm* — Cantor Colburn LLP (57) ABSTRACT

A method of fracturing multiple productive zones of a subterranean formation penetrated by a wellbore is disclosed. The method comprises injecting a fracturing fluid into each of the multiple production zones at a pressure sufficient to enlarge or create fractures in the multiple productive zones, wherein the fracturing fluid comprises an upconverting nanoparticle that has a host material, a dopant, and a surface modification such that the upconverting nanoparticle is soluble or dispersible in water, a hydrocarbon oil, or a combination thereof; recovering a fluid from one or more of the multiple production zones; detecting the upconverting nanoparticle in the recovered fluid by exposing the recovered fluid to an excitation radiation having a monochromatic wavelength; and identifying the zone that produces the recovered fluid or monitoring an amount of water or oil in the produced fluid by measuring an optical property of the upconverting nanoparticle in the recovered fluid.

13 Claims, 8 Drawing Sheets

(56) References Cited

U.S. PATENT DOCUMENTS

2016/0363693 A1* 12/2016 Murugesan .......... G01N 21/643
2017/0002629 A1    1/2017 Hurtevent et al.
2017/0022804 A1*  1/2017 Gupta ................. E21B 47/1015

* cited by examiner

UPCONVERTING NANOPARTICLES AS TRACERS FOR PRODUCTION AND WELL MONITORING

BACKGROUND

Tracers have been used in the oil and gas industry to provide valuable reservoir information such as productivity of producing formations or zones, inter-well connections, heterogenetities, and water movements. Traditionally, fluorescent tracers are used for these activities. One limitation of these fluorescent tracers, however, is the overlap of the signals from the tracers and the signals from certain organic molecules that are present in the wellbore fluids, making it difficult to make accurate measurements. Thus, the industry is receptive to alternative tracers and improved methods for reservoir monitoring and evaluation.

BRIEF DESCRIPTION

A method of fracturing multiple productive zones of a subterranean formation penetrated by a wellbore is disclosed. The method comprises injecting a fracturing fluid into each of the multiple production zones at a pressure sufficient to enlarge or create fractures in the multiple productive zones, wherein the fracturing fluid comprises an upconverting nanoparticle that has a host material, a dopant, and a surface modification such that the upconverting nanoparticle is soluble or dispersible in water, a hydrocarbon oil, or a combination thereof; recovering a fluid from one or more of the multiple production zones; detecting the upconverting nanoparticle in the recovered fluid by exposing the recovered fluid to an excitation radiation having a monochromatic wavelength; and identifying the zone that produces the recovered fluid or monitoring an amount of water or oil in the produced fluid by measuring an optical property of the upconverting nanoparticle in the recovered fluid.

In another embodiment, a method of determining water breakthrough in a production well associated with one or more injection wells comprises introducing a fluid comprising an upconverting nanoparticle into an injection well, the upconverting nanoparticle having a host material, a dopant, and a surface modification such that the upconverting nanoparticle is soluble or dispersible in both water and a hydrocarbon oil; flowing at least a portion of the fluid comprising the upconverting nanoparticle from the injection well into the production well; producing a production fluid from the production well; detecting the upconverting nanoparticle in the production fluid by exposing the production fluid to an excitation radiation having a monochromatic wavelength; and determining water breakthrough in the production well by qualitatively determining the presence or quantitatively measuring the amount of the upconverting nanoparticle in the production fluid.

In yet another embodiment, a method of monitoring well production comprises introducing an upconverting nanoparticle into a wellbore, the upconverting nanoparticle having a host material, a dopant, and a surface modification such that the upconverting nanoparticle is soluble or dispersible in water, a hydrocarbon oil, or a combination thereof; producing a fluid from the wellbore, the produced fluid containing the upconverting nanoparticle; exposing the upconverting nanoparticle to an excitation radiation from an electromagnetic radiation source within the wellbore; and identifying a zone that produces the fluid or monitoring an amount of water or oil in the produced fluid by measuring an optical property of the upconverting nanoparticle in the produced fluid within the wellbore.

In still another embodiment, a method of monitoring well production comprises introducing a cable comprising an upconverting nanoparticle into a wellbore, the upconverting nanoparticle having a host material, a dopant, and a surface modification such that the upconverting nanoparticle is soluble or dispersible in water, a hydrocarbon oil, or a combination thereof; exposing the upconverting nanoparticle to an excitation radiation while the upconverting nanoparticle is exposed to a fluid produced from the wellbore; and measuring an optical property of the upconverting nanoparticle to determine a zone that produces the fluid or monitoring an amount of water or oil in the produced fluid.

BRIEF DESCRIPTION OF THE DRAWINGS

The following descriptions should not be considered limiting in any way. With reference to the accompanying drawings, like elements are numbered alike.

DETAILED DESCRIPTION

The inventors have found that upconverting nanoparticles as disclosed herein can be used as alternative luminescent tracers. These upconverting nanoparticles have low energy excitation around 980 nm with high-energy emissions in the region of 200 to 950 nm. In particular, the signals from these upconverting nanoparticles are readily distinguishable from the signals generated from those organic molecules that are commonly injected into a wellbore during various operations, thus minimizing the background noise and providing reliable information for production and well monitoring. In addition, the upconverting nanoparticles are environmentally friendly. They are compatible with brines and oils and are stable at elevated temperatures for an extended period of time, thus these upconverting nanoparticles can be used in various downhole applications.

The upconverting nanoparticles have a host material, a dopant, and a surface modification such that the upconverting nanoparticle is soluble or dispersible in water, a hydrocarbon oil, or a combination thereof.

The host material of the upconverting nanoparticle is an inorganic compound having an ion of $Y^{3+}$, $La^{3+}$, $Gd^{3+}$, $Sc^{3+}$, $Ca^{2+}$, $Sr^{2+}$, $Ba^{2+}$, $Zr^{4+}$ or $Ti^{4+}$. Preferably, the host material comprises $NaYF_4$, $NaGdF_4$, $LiYF_4$, $YF_3$, $CaF_2$, $Gd_2O_3$, $LaF_3$, $Y_2O_3$, $ZrO_2$, $Y_2O_2S$, $La_2O_2S$, $Y_2BaZnO_5$, or $Gd_2BaZnO_5$.

Figure 1:
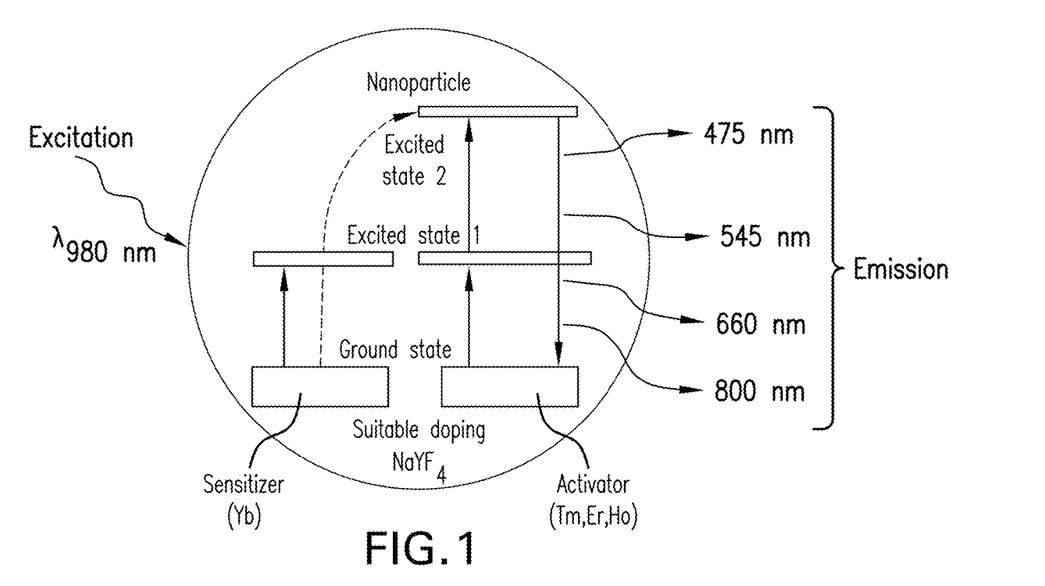
FIG. 1 is a scheme illustrating that upconverting nanoparticles can have different emission wavelengths with a single excitation of 980 nm by choosing suitable dopants.

The dopant ions play a central role by absorbing and emitting the photons. They determine, for example, the color of the emitted light. The upconverting nanoparticles can have multicolors, which is achieved by utilizing the different dopants. FIG. 1 shows the scientific phenomenon taking place in upconverting nanoparticles and illustrates that the emission wavelength can be tuned by choosing different dopants.

The dopant ion occupies part of the cation sites in the host lattice, and preferably the dopants and host lattice cations have a similar size. Examples of the dopants include $Er^{3+}$, $Yb^{3+}$, $Tm^{3+}$, $Ho^{3+}$, $Pr^{3+}$, $Nd^{3+}$, $Dy^{3+}$, $Ti^{2+}$, $Ni^{2+}$, $Mo^{3+}$, $Re^{4+}$, $Os^{4+}$, or a combination comprising at least one of the foregoing. Preferably, the dopant of the upconverting nanoparticle comprises $Er^{3+}$, $Yb^{3+}$, $Tm^{3+}$, $Ho^{3+}$ or a combination comprising at least one of the foregoing.

In an embodiment, dopant ions used in the upconverting nanoparticles are the pairs erbium-ytterbium ($Er^{3+}$, $Yb^{3+}$) or thulium-ytterbium ($Tm^{3+}$, $Yb^{3+}$). In such combinations ytterbium ions are added as antennas, to absorb light at around 980 nm and transfer it to the upconverter ion. If the upconverter ion is erbium, then a characteristic green and red emission is observed, while when the upconverter ion is thulium, the emission includes near-ultraviolet, blue and red light. The dopant can comprise about 5 mol % to about 30 mol % of $Yb^{3+}$ and about 1 mol % to about 3 mol % of one or more of the following: $Tm^{3+}$, $Ho^{3+}$, or $Er^{3+}$, each based on the total mole of the upconverting nanoparticle.

The upconverting nanoparticles can be functionalized to include chemical functional groups to increase dispersibility, solubility, compatibility, stability and other desirable properties of the upconverting nanoparticles in water, brine, oil, as well as emulsions thereof. As used herein, "functionalized upconverting nanoparticles" include both non-covalently functionalized upconverting nanoparticles and covalently functionalized upconverting nanoparticles. Non-covalent functionalization is based on van der Walls forces, hydrogen bonding, ionic interactions, dipole-dipole interactions, hydrophobic or π-π interactions. Covalent functionalization means that the functional groups are covalently bonded to the upconverting nanoparticles, either directly or via an organic moiety.

One way to functionalize upconverting nanoparticles is to grow an amorphous silica shell around the particles. The chemistry of silica is well known, and the properties of silica are very advantageous. A silica layer increases the negative charge of the surface and therefore enhances the dispersibility of the upconverting nanoparticles in polar solvents. As an example, hydrolysis reaction of monomeric tetraethyl orthosilicate (TEOS) followed by a condensation step generates a hydrophilic polymer that coats upconverting nanoparticles. The type of functionalization (e g, amino, thiol or carboxyl group) can be tuned by choosing an appropriate organosilane (e.g., 3-aminopropyltriethoxysilane (APTS), 3-mercaptopropyltriethoxysilane or 11-dimethylchlorosilyl undecanoyl chloride) to copolymerize with TEOS.

Upconverting nanoparticles may be coated with multilayers by consecutive adsorption of polyanions such as poly (styrene sulfonate) and polycations such as poly(allylamine hydrochloride). The thickness of the coating is controlled by adjusting the number of deposited layers.

Upconverting nanoparticles can also be coated with polyarcylic acid (PAA), polyethylene glycol (PEG), or a copolymer thereof. Depending on the methods of making, the upconverting nanoparticles can have different original ligands. The original ligand on the upconverting nanoparticles can bind the polymer by attracting their hydrophobic alkyl chains, and consequently the ligand is masked while hydrophilic segments of the copolymer bearing the selected functional groups cover the outer surface. The original ligand may be exchanged to another one such as citric acid, PEG diacid, dendrimer, hexanedioic acid or PEG-phosphonate, and the like.

The upconverting nanoparticles can have an average particle size of less than about 100 nm, for example about 20 to about 90 nm. The thickness of the coating, if present, can be in the range of about 1 nm to about 15 nm or about 1 nm to about 10 nm.

The upconverting nanoparticles can be introduced into a subterranean formation penetrated by a wellbore, and by analyzing a sample of the fluid obtained from the wellbore, various properties of the subterranean formation can be obtained. As used herein, analyzing the sample include determining the presence or absence of the upconverting nanoparticles as well as measuring one or more optical properties of the upconverting nanoparticles. The optical properties of upconverting nanoparticles normally can be used to determine at least one property of the subterranean formation penetrated by a well. Exemplary optical properties include an absorption spectrum, an absorption intensity, a peak absorption wavelength, an emission spectrum, a peak emission wavelength, and a fluorescence intensity of upconverting nanoparticles. Methods of measuring the optical properties of upconverting nanoparticles are known in the art and are not particularly limited.

Exemplary properties or information that can be determined include a production zone within the subterranean formation, the productivity of the zones within the formation, an identification of injection well contributing to the flow of breakthrough water, flow paths through the subterranean formation, and the like. By analyzing the information and taking appropriate actions, the production of hydrocarbons can be improved.

In an embodiment, the upconverting nanoparticles are introduced into the subterranean formation with a fluid delivery system configured to deliver a fluid having the upconverting nanoparticles suspended therein to the subterranean formation.

Delivery fluids transporting upconverting nanoparticles into the formation are aqueous or non-aqueous based. Exemplary carriers include brine, such as a potassium chloride or sodium chloride brine or divalent brine such as calcium chloride or zinc bromide brine; salt water such as seawater; fresh water; a liquid hydrocarbon; or a surfactant based fluid. The upconverting nanoparticles may further be injected into the formation in gas such as carbon dioxide, nitrogen and carbon dioxide/nitrogen, liquefied gas, such as liquefied natural gas or liquefied petroleum gas as well as in foams. The delivery fluid is preferably aqueous, steam or gas (water flooding, steam flooding or gas flooding).

Generally, fluids pumped into the formation, injection well, or production well do not require excessive amounts of the upconverting nanoparticles. The minimum amount of upconverting nanoparticles in the fluid introduced into the formation, the production well or injection well is that amount sufficient to permit detection within a produced fluid. Typically, the amount of upconverting nanoparticles present in the introduced fluid is between from about 0.1 ppb to about 500,000 ppm.

The upconverting nanoparticles may be detected in recovered produced fluids. Thus, in some embodiments, the methods described herein do not require downhole equipment for detection. Fluids transported out of the well are evaluated, and the upconverting nanoparticles can be identified at a location distant from the wellbore.

The upconverting nanoparticles may be used to identify a source of fluids produced from a production well. As an example, upconverting nanoparticles may be introduced proximate the aquifer zone. Produced fluids may be analyzed to determine if the produced fluids include an optical property of the upconverting nanoparticles introduced into the aquifer zone. Identification of the corresponding optical property may be an indication that the produced fluid includes water from the aquifer zone.

Upconverting nanoparticles exhibiting different optical properties may be introduced into various zones of the subterranean formation to determine a location (e.g., a zone) from which produced fluids (e.g., hydrocarbons, water, etc.) originate. In other words, the upconverting nanoparticles introduced into different zones are qualitatively (and optionally also quantitatively) distinguishable in order to identify the zone or area within the formation from which a produced fluid originates. As such, the upconverting nanoparticles introduced into each of the zones being treated preferably exhibit unique absorption and optical properties such that the properties of upconverting nanoparticles introduced into one zone is unable to mask the properties of upconverting nanoparticles introduced into another zone. Thus, a produced fluid exhibiting an optical property corresponding to a property of upconverting nanoparticles introduced into a zone of the subterranean zone may be an indication that the produced fluid originated from the zone in which the upconverting nanoparticles were introduced.

Advantageously, the nanoparticles introduced into different zones emit a different color of light when exposed to the same excitation radiation having a monochromatic wavelength. In an embodiment, the monochromatic wavelength is about 980 nanometers (nm). Thus different types of the upconverting nanoparticles can be conveniently detected with the same excitation radiation.

In some embodiments, the upconverting nanoparticles may be introduced into the subterranean formation during stimulation processes. Stimulation processes such as, for example, hydraulic fracturing (i.e., "fracing") may be used to enhance hydrocarbon recovery from a hydrocarbon-bearing subterranean formation. In hydraulic fracturing operations, hydraulic fractures may be created or enlarged by injecting a fluid containing additives and including a suspended proppant material (e.g., sand, ceramics, etc.) into a targeted subterranean formation under elevated pressure conditions sufficient to cause the hydrocarbon-bearing formation material to fracture. The upconverting nanoparticles may be included in the fracturing fluid. Thus, in an embodiment, a method of fracturing multiple zones of a subterranean formation penetrated by a well comprises: pumping into each zone of the formation to be fractured a fracturing fluid, wherein the fracturing fluid pumped into each zone comprises a qualitatively distinguishable tracer comprising upconverting nanoparticles which are either hydrocarbon soluble/dispersible, water soluble/dispersible or both hydrocarbon soluble/dispersible and water soluble/dispersible; enlarging or creating a fracture in the formation; recovering fluid from at least one of the multiple zones; and identifying the zone within the subterranean formation from which the recovered fluid was produced by identifying the upconverting nanoparticles in the recovered fluid. In another embodiment, a method of monitoring the production of fluids produced in multiple productive zones of a subterranean formation penetrated by a well comprises pumping fracturing fluid into the multiple productive zones at a pressure sufficient to enlarge or create fractures in each of the multiple productive zones, wherein the fracturing fluid comprises upconverting nanoparticles which are either hydrocarbon soluble/dispersible, water soluble/dispersible or both hydrocarbon soluble/dispersible and water soluble/dispersible and further wherein the fluorescent upconverting nanoparticles pumped into each of the multiple productive zones is qualitatively and/or quantitatively distinguishable; and monitoring the amount of fluids (water or oil) produced from at least one of the multiple productive zones from the upconverting nanoparticles in the produced fluid.

In an embodiment, the upconverting nanoparticles are present in composites where they are immobilized in a matrix or coated on a solid support. Exemplary matrix includes an emulsion, a binder (e.g. compressing upconverting nanoparticles with a binder into a solid particulate), a porous particulate, an inorganic material having a layered structure, or the like. Preferably the upconverting nanoparticles can be released in a controlled manner from the composites. The controlled release of the upconverting nanoparticles may be dependent upon the surface charges between the tracer and support which, in turn, may be dependent on the adsorption/desorption properties of the tracer to adsorbent, pH variations, salinity, hydrocarbon composition, temperature, and pressure.

In addition to monitoring different zones in hydrocarbon production wells and determining the zone in which hydrocarbons have been produced from the formation, the upconverting nanoparticles may also be used to monitor the amount of oil and/or water produced. In particular, the inventors have found that upconverting nanoparticles such as oil soluble or oil dispersible ones, can be used to quantify the amount of oil (hydrocarbon) in a fluid produced from a wellbore, and water soluble or water dispersible upconverting nanoparticles can be used to quantify the amount of water in a fluid produced from a wellbore. Such fluids can be a water in oil or oil in water emulsion.

Further, the upconverting nanoparticles may also be used to determine sites of flowback water and produced water as well as for detection or early warning of phenomena such as water breakthrough. The upconverting nanoparticles may be introduced into an injection fluid during at least one of water flooding, steam assisted gravity drainage, steam flooding, cyclic steam stimulation, or other enhanced oil recovery stimulation processes to determine fluid flow paths through the subterranean formation and into produced fluids.

In other embodiments, qualitatively distinguishable upconverting nanoparticles are preferably introduced into the aqueous fluid introduced into the different injection wells. The upconverting nanoparticles used in this embodiment are typically water dispersible. Fluids produced from one or more production wells may be analyzed for the presence of the upconverting nanoparticles in the produced fluid. The presence of upconverting nanoparticles in produced fluids from a production well may indicate water breakthrough. The injection well, into which the water in the breakthrough water has been determined to have been initially introduced, can be shut off. Thus, the upconverting nanoparticles can be used to optimize enhancement of hydrocarbons during secondary recovery operations by shutting down the injection well and terminating the flow of water from the injection well directly into the production well.

The upconverting nanoparticles may also be used to sweep a production well in an enhanced oil recovery (EOR) operation, such as flooding. Upconverting nanoparticles may be introduced into injection fluid and the injection fluid is then introduced into the formation. The injection fluid may be introduced by being pumped into one or more injection wells. Typically, the upconverting nanoparticles are dispersible in the delivery fluid. The detection of the upconverting nanoparticles in fluids produced from the production well is indicative that the sweep, i.e., removal of the oil from pore spaces within the formation, has been completed.

If needed, the upconverting nanoparticles can be analyzed within the wellbore. In an embodiment, a method of monitoring well production comprises introducing an upconverting nanoparticle as disclosed herein into a wellbore; producing a fluid from the wellbore, the produced fluid containing the upconverting nanoparticle; exposing the upconverting nanoparticle to an excitation radiation from an electromagnetic radiation source within the wellbore; and identifying a zone that produces the fluid or monitoring an amount of water or oil in the produced fluid by measuring an optical property of the upconverting nanoparticle in the produced fluid within the wellbore.

Alternatively or in addition, a method of monitoring well production includes introducing a cable comprising an upconverting nanoparticle as disclosed herein into a wellbore; exposing the upconverting nanoparticle to an excitation radiation while the upconverting nanoparticle is exposed to a fluid produced from the wellbore; and measuring an optical property of the upconverting nanoparticle to determine a zone that produces the fluid or monitoring an amount of water or oil in the produced fluid. The cable can be a fiber optic cable. The nanoparticles can be present as a coating on a portion of the fiber optic cable. The nanoparticles can also be dispersed in at least a portion of the fiber optic cable.

A radiation source can be located within the wellbore to provide the excitation radiation to the upconverting nanoparticles. For example, a radiation source (e.g., a light source) may be coupled to a fiber optic cable, which may transmit the excitation radiation to the upconverting nanoparticles. Responsive to exposure to the excitation radiation, the upconverting nanoparticles re-emit radiation at a different wavelength than the excitation wavelength, and the emitted radiation can be transmitted through an optical fiber to a detector to measure the desired optical properties of the upconverting nanoparticles.

Figure 11:
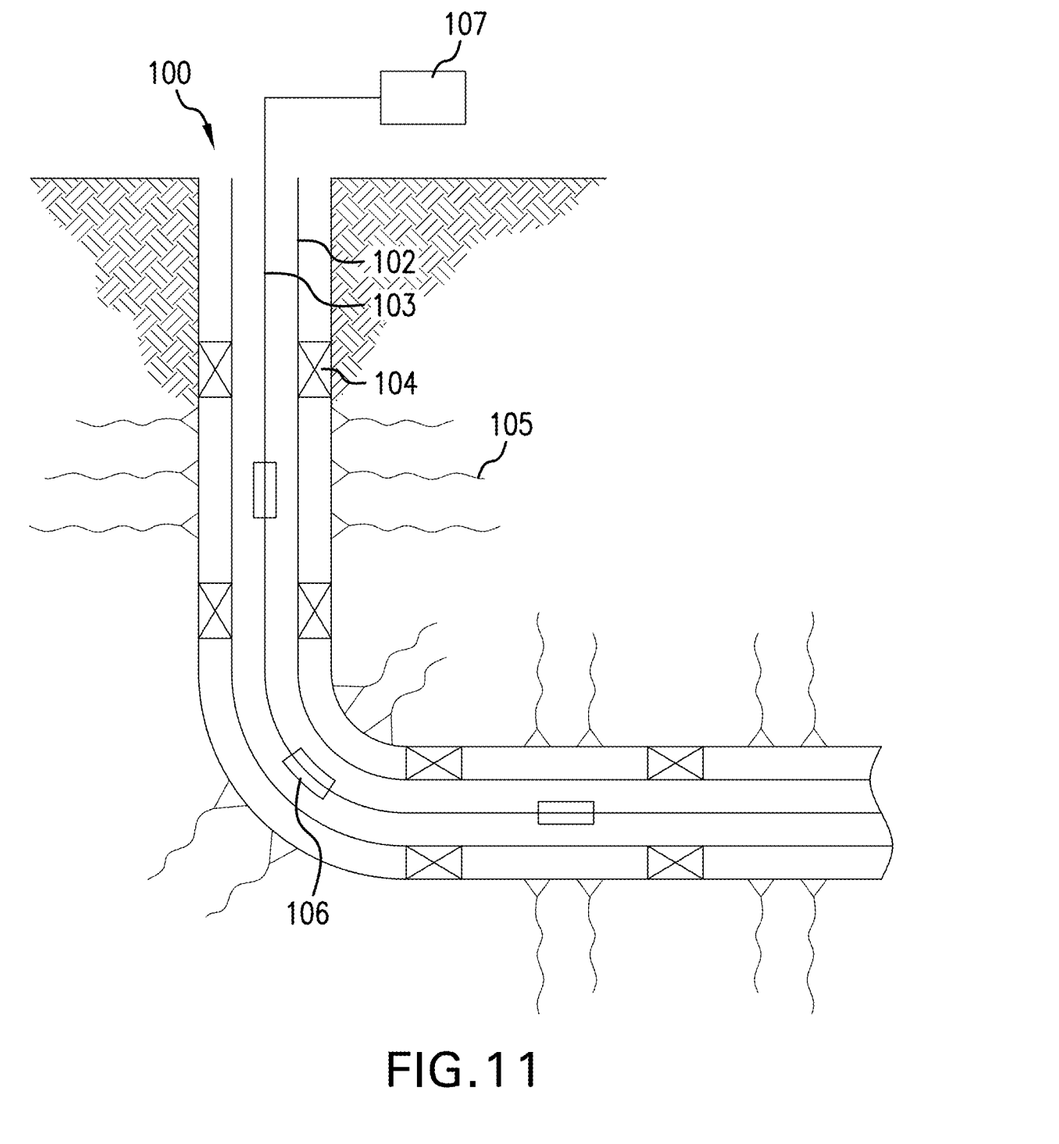
FIG. 11 is a schematic illustration of a system that is disposed in a downhole environment according to an embodiment of the disclosure.

Referring to FIG. 11, a wellbore system 100 includes a fiber optic cable 103 extending from a surface location of a subterranean formation to locations adjacent to one or more zones within the subterranean formation. The zones are separated by packers 104 and may have fractures 105. The fiber optic cable 103 can extend along an interior of a production string 102. One or more analysis unit (106) can be coupled to the fiber optic cable. The analysis unit can include a radiation source and a detector. The detected signals from the upconverting nanoparticles can be processed either downhole or on the surface. The results can be displaced and stored at an electronic device such as a computer 107.

EXAMPLES

Upconverting tracers used in the examples have a host material (matrix) of $NaYF_4$ with dopants of Yb and Er for green emission (T1) or Yb and Tm for red emission (T2). These nanoparticles are synthesized in oleic acid/oleylamine mixture at temperature around 300° C. The synthesized upconverting nanoparticles have functional groups that are oleic acid, which makes them to be soluble in oil due to their hydrophobic behavior.

Figure 2:
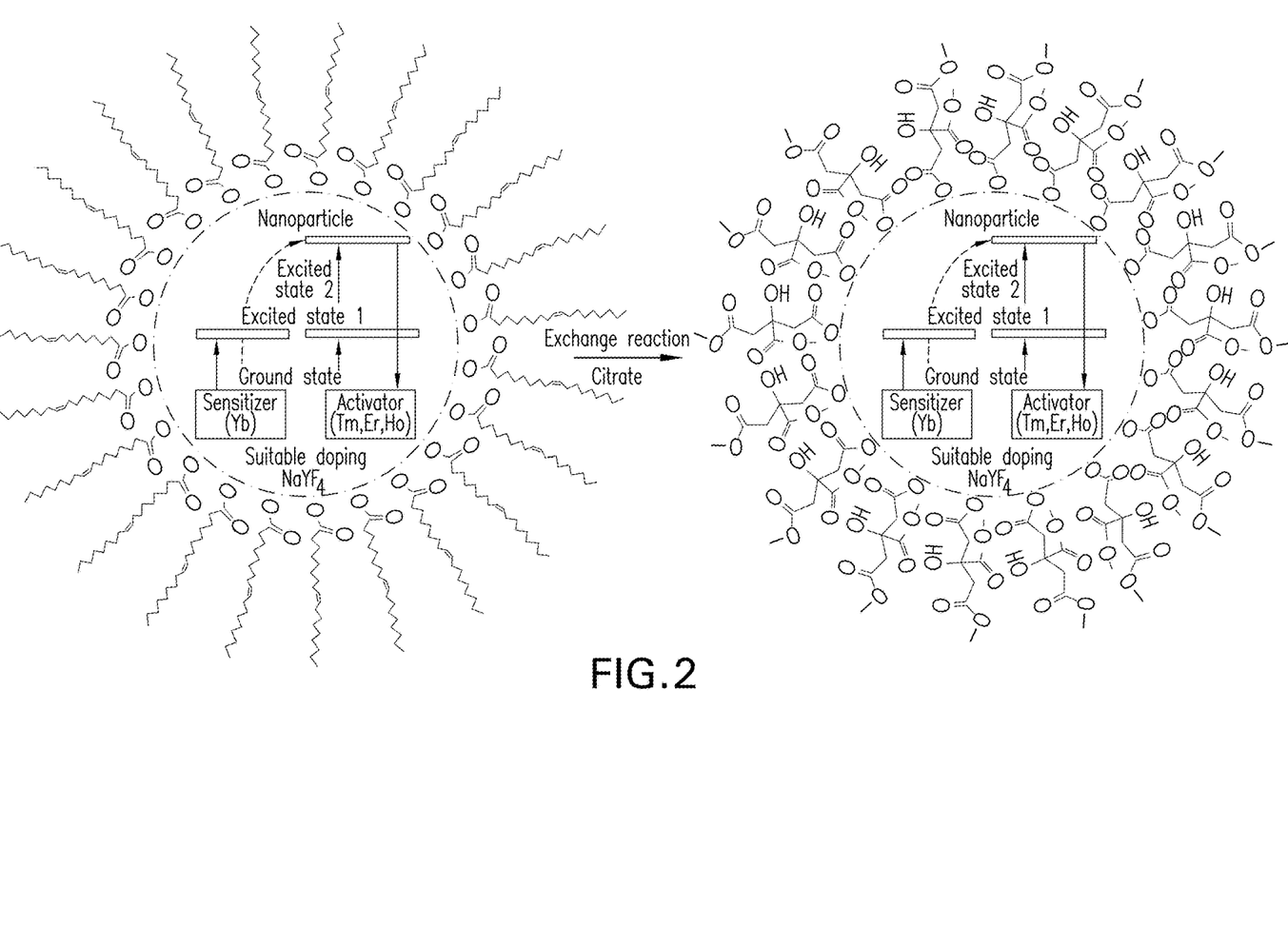
FIG. 2 is a schematic representation of surface modification of nanoparticles with citrate to make tracers water dispersible.

To make these particles to be dispersible in water, the oleic acid functional groups can be exchanged or modified with different chemical functional groups. An exchange reaction with citric acid is illustrated in FIG. 2.

Stable crude oil emulsion was prepared by mixing 2 mL of a surfactant with 100 mL of an API brine and 500 microliters of oil. The mixture was sonicated (2 h) in a sonication bath to obtain an oil in water emulsion. The API brine was prepared by dissolving 200 g of sodium chloride and 50 g of calcium chloride dihydrate in de-ionized water (2.25 L).

Figure 3A:
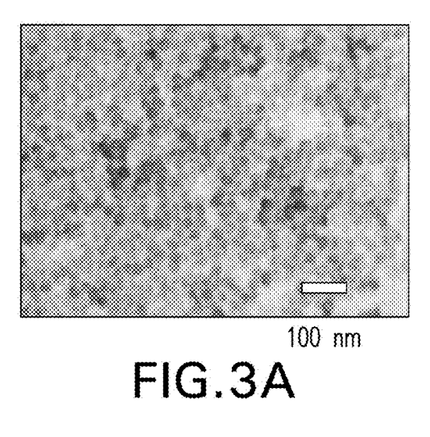
FIG. 3A shows the SEM image of surface functionalized upconverting nanoparticles NaYF4: Yb, Er (A, T1)
Figure 3B:
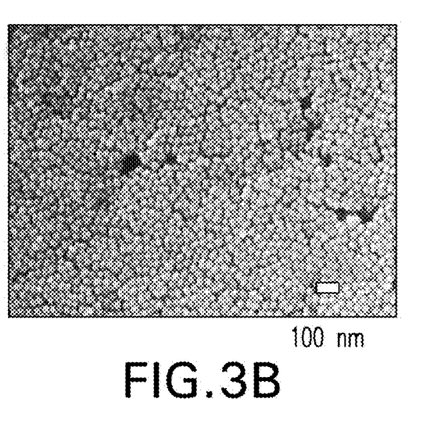
FIG. 3B shows the SEM image of surface functionalized upconverting nanoparticles NaYF4:Yb, Tm (B, T2)

Upconverting nanoparticle tracers were analyzed by scanning electron microscopy (SEM) using a field-emission scanning electron microscope. Luminescence measurements were obtained by using a Horiba Jobin Yvon Fluorolog 3 spectrofluorometer equipped with a single grating monochromator and a photomultiplier tube detector having an accuracy of 0.5 nm modified with light source of 980 nm CW laser of 2 W energy. The SEM images of tracers 1 and 2 are shown in FIG. 3A and FIG. 3B respectively.

Figure 5:
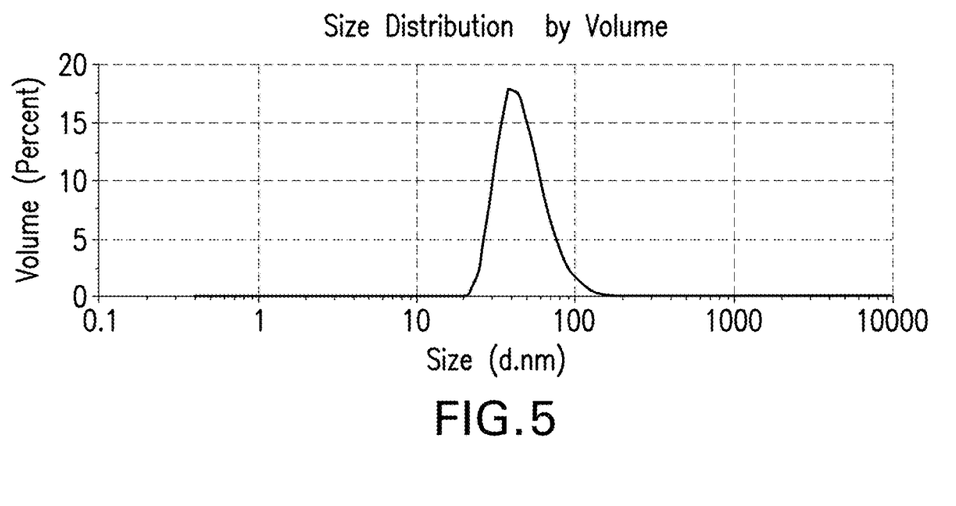
FIG. 5 shows nanoparticle size frequency curve for tracer T1.
Figure 6:
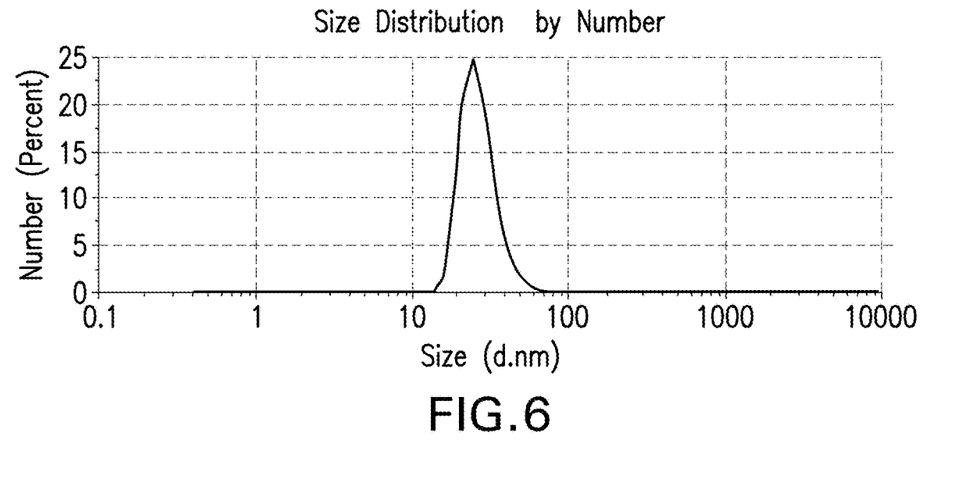
FIG. 6 shows nanoparticle size frequency curve for tracer T2.

The surface modified nanoparticles were tested for its hydrodynamic radius. The particle size distributions measured at 70° C. for dilute dispersion of Tracer 1 and Tracer 2 separately in de-ionized are shown in FIG. 5 and FIG. 6. Mean particle size and poly-dispersity index from the same measurements are shown in Table 1. Size measurements were conducted for two hours. The size for Tracer 1 and Tracer 2 is found to small enough to pass thorough the flow cell in the sand pack experiment and we anticipate no particle size related losses in the sand pack.

TABLE 1

| Nanoparticle | Size (nm) | PDI |
| --- | --- | --- |
| Tracer 1 | 48 ± 18 | 0.14 |
| Tracer 2 | 35 ± 15 | 0.34 |

Figure 7:
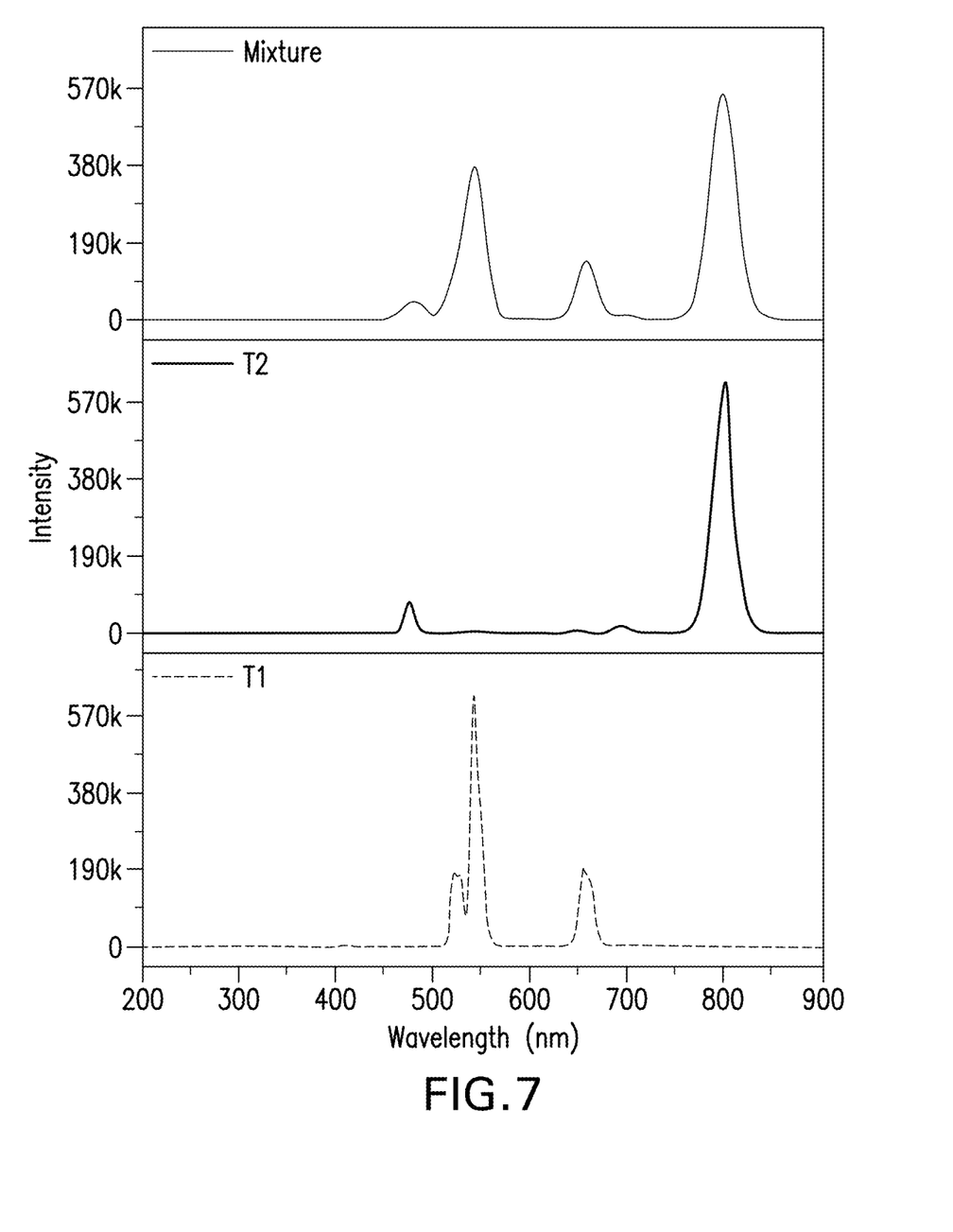
FIG. 7 shows the luminescence spectrum of tracer T1, T2, or a combination thereof in an API brine/crude oil/water emulsion at 980 nm excitation.
Figure 8:
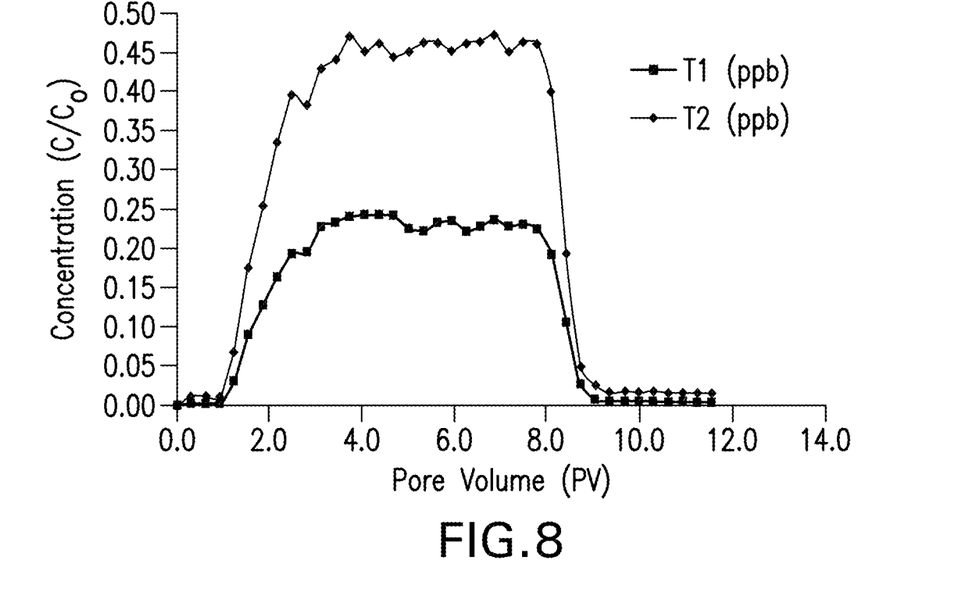
FIG. 8 shows eluting concentration in part per billion (ppb) for tracer T1 and tracer T2.

Luminescence measurements were performed on the tracer particles present in crude oil/API brine/water emulsion. Tracer 1 (25 ppm), tracer 2 (25 ppm), and a combination of tracer 1 and tracer 2 (25 ppm) are independently dispersed in the crude oil/API brine emulsion. FIG. 7 shows the luminescence spectrum of trace T1, tracer T2, or a combination thereof in API brine/crude oil/water emulsion. The results show that T1 has a green emission with a maximum wavelength around 542 nm and T2 has a red emission with a maximum wavelength around 800 nm. These peak features are maintained in the mixture of two tracers. For the further analysis of the samples in the static and flow experiment peaks at 542 and 800 nm are used for T1 and T2 respectively.

Static adsorption test was performed on the powder of calcium carbonate powder (MILCARB 150) and 20/40 mesh sands. 0.25 grams of MILCARB 150 (sample 1 & 3) and 0.25 grams 20/40 mesh sand (sample 2 & 4) were taken separately in glass tubes. One ppm concentration of the mixture of tracer 1 and tracer 2 was prepared separately in the API brine and the oil-in-water emulsion. Five millimeters of the solution was injected in the each tube. All the tubes were shaken gently and put in an oven at 70° C. for 15 hours. After 15 hours, tubes were removed from the oven and allowed to cool to room temperature. Liquid portion of the tubes were analyzed on fluorolog for the concentration measurements.

Liquid portion of the tubes were analyzed on fluorolog for the concentration measurements. From the difference in the initial and final concentration of tracers in the aqueous phase, adsorption on the powder was calculated, and the results are shown in Table 2.

TABLE 2

| Tube No. | Particle Type | Fluid | % Adsorption for T1 | % Adsorption for T2 |
|---|---|---|---|---|
| 1 | MILCARB 150 | API Brine | 62 | 71 |
| 2 | 20/40 Sands | API Brine | 25 | 40 |
| 3 | MILCARB 150 | Oil-in-Water Emulsion | 59 | 64 |
| 4 | 20/40 Sands | Oil-in-Water Emulsion | 4 | 31 |

The tracers in API brine have more adsorption as compared to tracers in the oil-in-Water emulsion. Without wishing to be bound by theory, it is believed that the electrostatic interaction of ions in the API brine with the polar components in the crude oil results in their lesser interactions with the tracers, leading to lower adsorption. Similarly, the adsorption on the 20/40 sand is lower, indicating tracer 1 and tracer 2 has less affinity towards negatively charged surfaces like 20/40 sands.

Figure 4:
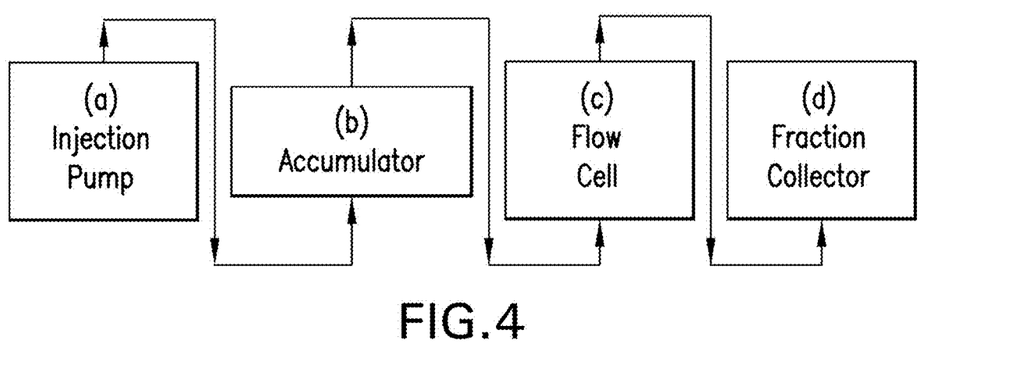
FIG. 4 illustrates a flow testing diagram.

The system 4 as shown in Table 2 was selected for flow experiment. Flow testing of the T1 and T2 mixture in the crude oil/API brine emulsion was conducted on a sand pack flow setup. The experiment was conducted at the flow rate of 5 mL/min at 70° C. Gravel pack sand (20/40 mesh) was filled and compressed in the flow cell to prepare 4.4 inches tall sand pack column. Initially, API brine at 5 mL/min flow rate was injected through the sand pack followed by the injection of nanoparticle mixture in the emulsion at the same flow rate through an accumulator. Nanoparticle dispersion was injected from the bottom of the flow cell and samples were collected from top of the cell in the fraction collector at a regular interval. Prior to the injection, nanoparticle dispersion used in the experiment was filtered through the 200 nm PTFE filter. The flow testing diagram is shown in FIG. 4.

Figure 9:
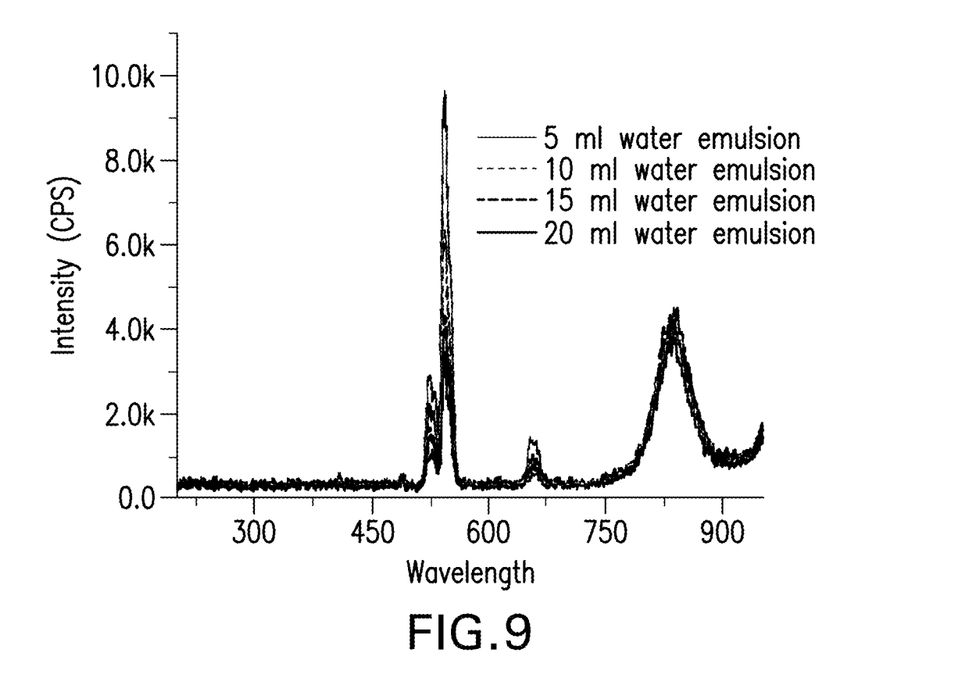
FIG. 9 shows the emission spectra of water emulsions containing an upconverting nanoparticle at 980 nm excitation.

Eluting concentration is plotted on tracer 1 and tracer 2 as detected on the florolog is shown FIG. 9. FIG. 9 shows that for tracer 1, almost half of the injected concentration is adsorbed in the sand pack, and over 80% of the tracer 2 seems to be adsorbed in the sand pack. The injected tracer concentration remained the same after two hours indicating that the tracers have very good stability in the emulsion.

Figure 10:
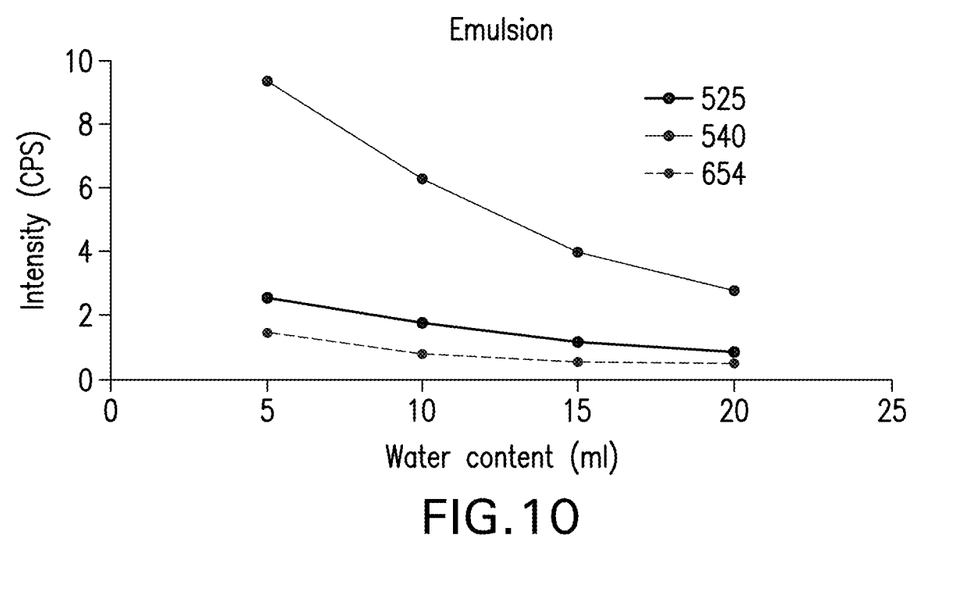
FIG. 10 shows the intensity of emission as a function of water content for a fluid containing an upconverting nanoparticle at 980 nm excitation.

Additional results are shown in FIGS. 10 and 11, were FIG. 10 shows intensity of emission as a function of water content for a fluid containing an upconverting nanoparticle at 980 nm excitation; and FIG. 11 is a schematic illustration of a system that is disposed in a downhole environment according to an embodiment of the disclosure. The results indicate that upconverting tracers can be used to determine the amount of water in an emulsion.

Set forth are various embodiments of the disclosure.

Embodiment 1

A method of fracturing multiple productive zones of a subterranean formation penetrated by a wellbore, the method comprising: injecting a fracturing fluid into each of the multiple production zones at a pressure sufficient to enlarge or create fractures in the multiple productive zones, wherein the fracturing fluid comprises an upconverting nanoparticle that has a host material, a dopant, and a surface modification such that the upconverting nanoparticle is soluble or dispersible in water, a hydrocarbon oil, or a combination thereof; recovering a fluid from one or more of the multiple production zones; detecting the upconverting nanoparticle in the recovered fluid by exposing the recovered fluid to an excitation radiation having a monochromatic wavelength; and identifying the zone that produces the recovered fluid or monitoring an amount of water or oil in the produced fluid by measuring an optical property of the upconverting nanoparticle in the recovered fluid.

Embodiment 2

The method of any one of the preceding embodiments, wherein the upconverting nanoparticle injected into each of the multiple production zones emits a different color of light when exposed to the same excitation radiation having the monochromatic wavelength.

Embodiment 3

The method of any one of the preceding embodiments, wherein the monochromatic wavelength is about 980 nanometers.

Embodiment 4

The method of any one of the preceding embodiments, wherein the upconverting nanoparticle is immobilized in a matrix or coated on a solid support, and is configured to be controllably released to the produced fluid.

Embodiment 5

The method of any one of the preceding embodiments, further comprising releasing the upconverting nanoparticle from the composite to the produced fluid.

Embodiment 6

The method of any one of the preceding embodiments, wherein measuring an optical property of the upconverting nanoparticle in the recovered fluid comprises measuring adsorption spectrum, an emission spectrum, an absorption intensity, a peak absorption wavelength, a peak emission wavelength, an emission intensity of the upconverting nanoparticle, or a combination comprising at least one of the foregoing.

Embodiment 7

The method of any one of the preceding embodiments, wherein the host material of the upconverting nanoparticle is an inorganic compound having an ion of $Y^{3+}$, $La^{3+}$, $Gd^{3+}$, $Sc^{3+}$, $Ca^{2+}$, $Ba^{2+}$, $Zr^{4+}$ or $Ti^{4+}$; and the dopant of the upconverting nanoparticle comprises $Er^{3+}$, $Yb^{3+}$, $Tm^{3+}$, $Ho^{3+}$, $Pr^{3+}$, $Nd^{3+}$, $Dy^{3+}$, $Ti^{2+}$, $Ni^{2+}$, $Mo^{3+}$, $Re^{4+}$, $Os^{4+}$, or a combination comprising at least one of the foregoing.

Embodiment 8

The method of any one of the preceding embodiments, wherein the host material of the upconverting nanoparticle comprises $NaYF_4$, $NaGdF_4$, $LiYF_4$, $YF_3$, $CaF_2$, $Gd_2O_3$, $LaF_3$, $Y_2O_3$, $ZrO_2$, $Y_2O_2S$, $La_2O_2S$, $Y_2BaZnO_5$, or $Gd_2BaZnO_5$, and the dopant of the upconverting nanoparticle comprises $Er^{3+}$, $Yb^{3+}$, $Tm^{3+}$, $Ho^{3+}$ or a combination comprising at least one of the foregoing.

Embodiment 9

The method of any one of the preceding embodiments, wherein the dopant comprises about 5 mol % to about 30 mol % of $Yb^{3+}$ and about 1 mol % to about 3 mol % of one or more of the following: $Tm^{3+}$, $Ho^{3+}$, or $Er^{3+}$, each based on the total mole of the upconverting nanoparticle.

Embodiment 10

The method of any one of the preceding embodiments, wherein the upconverting nanoparticle is surface modified with citric acid.

Embodiment 11

The method of any one of the preceding embodiments, wherein the upconverting nanoparticle has a coating of a polyethylene glycol, a polyacrylic acid, a derivative thereof, or a combination comprising as least one of the foregoing.

Embodiment 12

A method of determining water breakthrough in a production well associated with one or more injection wells, the method comprising: introducing a fluid comprising an upconverting nanoparticle into an injection well, the upconverting nanoparticle having a host material, a dopant, and a surface modification such that the upconverting nanoparticle is soluble or dispersible in both water and a hydrocarbon oil; flowing at least a portion of the fluid comprising the upconverting nanoparticle from the injection well into the production well; producing a production fluid from the production well; detecting the upconverting nanoparticle in the production fluid by exposing the production fluid to an excitation radiation having a monochromatic wavelength; and determining water breakthrough in the production well by qualitatively determining the presence or quantitatively measuring the amount of the upconverting nanoparticle in the production fluid.

Embodiment 13

The method of any one of the preceding embodiments, further comprising identifying, upon water breakthrough in the production well, the injection well that supplies the breakthrough water by qualitatively determining the presence of the upconverting nanoparticle introduced into the injection well.

Embodiment 14

The method of any one of the preceding embodiments, further comprising shutting off the identified injection well.

Embodiment 15

The method of any one of the preceding embodiments, wherein the monochromatic wavelength is about 980 nm.

Embodiment 16

The method of any one of the preceding embodiments, wherein the host material of the upconverting nanoparticle is an inorganic compound having an ion of $Y^{3+}$, $La^{3+}$, $Gd^{3+}$, $Sc^{3+}$, $Ca^{2+}$, $Sr^{2+}$, $Ba^{2+}$, $Zr^{4+}$ or $Ti^{4+}$; and the dopant of the upconverting nanoparticle comprises $Er^{3+}$, $Yb^{3+}$, $Tm^{3+}$, $Ho^{3+}$, $Pr^{3+}$, $Nd^{3+}$, $Dy^{3+}$, $Ti^{2+}$, $Ni^{2+}$, $Mo^{3+}$, $Re^{4+}$, $Os^{4+}$, or a combination comprising at least one of the foregoing.

Embodiment 17

The method of any one of the preceding embodiments, wherein the upconverting nanoparticle is surface modified with citric acid or the upconverting nanoparticle has the coating of a polyethylene glycol, a polyacrylic acid, a derivative thereof, or a combination comprising as least one of the foregoing.

Embodiment 18

A method of monitoring well production, the method comprising: introducing an upconverting nanoparticle into a wellbore, the upconverting nanoparticle having a host material, a dopant, and a surface modification such that the upconverting nanoparticle is soluble or dispersible in water, a hydrocarbon oil, or a combination thereof; producing a fluid from the wellbore, the produced fluid containing the upconverting nanoparticle; exposing the upconverting nanoparticle to an excitation radiation from an electromagnetic radiation source within the wellbore; and identifying a zone that produces the fluid or monitoring an amount of water or oil in the produced fluid by measuring an optical property of the upconverting nanoparticle in the produced fluid within the wellbore.

Embodiment 19

The method of any one of the preceding embodiments, wherein the upconverting nanoparticle is introduced into the wellbore in a fracturing fluid.

Embodiment 20

The method of any one of the preceding embodiments, wherein the host material of the upconverting nanoparticle comprises $NaYF_4$, $NaGdF_4$, $LiYF_4$, $YF_3$, $CaF_2$, $Gd_2O_3$, $LaF_3$, $Y_2O_3$, $ZrO_2$, $Y_2O_2S$, $La_2O_2S$, $Y_2BaZnO_5$, or $Gd_2BaZnO_5$, and the dopant of the upconverting nanoparticle comprises $Er^{3+}$, $Yb^{3+}$, $Tm^{3+}$, $Ho^{3+}$ or a combination comprising at least one of the foregoing.

Embodiment 21

The method of any one of the preceding embodiments, wherein the upconverting nanoparticle is surface modified with citric acid or the upconverting nanoparticle has the coating of a polyethylene glycol, a polyacrylic acid, a derivative thereof, or a combination comprising as least one of the foregoing.

Embodiment 22

A method of monitoring well production, the method comprising: introducing a cable comprising an upconverting nanoparticle into a wellbore, the upconverting nanoparticle having a host material, a dopant, and a surface modification such that the upconverting nanoparticle is soluble or dispersible in water, a hydrocarbon oil, or a combination thereof; exposing the upconverting nanoparticle to an excitation radiation while the upconverting nanoparticle is exposed to a fluid produced from the wellbore; and measuring an optical property of the upconverting nanoparticle to determine a zone that produces the fluid or monitoring an amount of water or oil in the produced fluid.

Embodiment 23

The method of any one of the preceding embodiments, wherein introducing a cable comprising an upconverting nanoparticle into a wellbore comprises introducing a fiber optic cable comprising a coating of the upconverting nanoparticle into the wellbore.

Embodiment 24

The method of any one of the preceding embodiments, wherein introducing a cable comprising an upconverting nanoparticle into a wellbore comprises introducing a fiber optic cable comprising the upconverting nanoparticle dispersed in at least a portion of the fiber optic cable.

All ranges disclosed herein are inclusive of the endpoints, and the endpoints are independently combinable with each other. "Or" means "and/or." All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity, which can be ±10% of the specified value).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of fracturing multiple production zones of a subterranean formation penetrated by a wellbore, the method comprising:
   injecting a fracturing fluid into each of the multiple production zones at a pressure sufficient to enlarge or create fractures in the multiple production zones, wherein the fracturing fluid injected into each of the multiple production zones comprises a qualitatively distinguishable upconverting nanoparticle that has a host material, a dopant, and a surface modification such that the upconverting nanoparticle is soluble or dispersible in water, a hydrocarbon oil, or a combination thereof;
   recovering a fluid from one or more of the multiple production zones;
   detecting the upconverting nanoparticle in the recovered fluid by exposing the recovered fluid to an excitation radiation having a monochromatic wavelength; and
   identifying the zone that produces the recovered fluid by measuring an optical property of the upconverting nanoparticle in the recovered fluid,
   wherein the host material of the upconverting nanoparticle comprises $NaYF_4$, $NaGdF_4$, $LiYF_4$, $YF_3$, $CaF_2$, $Gd_2O_3$, $LaF_3$, $Y_2O_3$, $ZrO_2$, $Y_2O_2S$, $La_2O_2S$, $Y_2BaZnO_5$, or $Gd_2BaZnO_5$;
   the dopant comprises about 5 mol % to about 30 mol % of $Yb^{3+}$ and about 1 mol % to about 3 mol % of one or more of the following: $Tm^{3+}$, $Ho^{3+}$, or $Er^{3+}$, each based on the total mole of the upconverting nanoparticle; and
   the upconverting nanoparticle injected into each of the multiple production zones emits a different color of light when exposed to the same excitation radiation having the monochromatic wavelength.

2. The method of claim 1, wherein the monochromatic wavelength is about 980 nanometers.

3. The method of claim 1, wherein the upconverting nanoparticle is immobilized in a matrix or coated on a solid support to form a composite, and is configured to be controllably released to the produced fluid.

4. The method of claim 3, further comprising releasing the upconverting nanoparticle from the composite to the produced fluid.

5. The method of claim 1, wherein measuring the optical property of the upconverting nanoparticle in the recovered fluid comprises measuring adsorption spectrum, an emission spectrum, an absorption intensity, a peak absorption wavelength, a peak emission wavelength, an emission intensity of the upconverting nanoparticle, or a combination comprising at least one of the foregoing.

6. The method of claim 1, wherein the upconverting nanoparticle is surface modified with citric acid.

7. The method of claim 1, wherein the upconverting nanoparticle has a coating of a polyethylene glycol, a polyacrylic acid, a derivative thereof, or a combination comprising as least one of the foregoing.

8. A method of determining water breakthrough in a production well associated with a plurality of injection wells, the method comprising:
   introducing into each of the plurality of injection wells an aqueous fluid comprising a qualitatively distinguishable upconverting nanoparticle having a host material, a dopant, and a surface modification such that the upconverting nanoparticle is water soluble or water dispersible, the upconverting nanoparticle injected into each of the plurality of injection wells emits a different color of light when exposed to an excitation radiation having a monochromatic wavelength;
   flowing at least a portion of the fluid comprising the upconverting nanoparticle from at least one of the plurality of injection wells into the production well;
   producing a production fluid from the production well;
   detecting the upconverting nanoparticle in the production fluid by exposing the production fluid to the excitation radiation having the monochromatic wavelength; and determining water breakthrough in the production well by qualitatively determining the presence or quantitatively measuring the amount of the upconverting nanoparticle in the production fluid, wherein the host material of the upconverting nanoparticle comprises $NaYF_4$, $NaGdF_4$, $LiYF_4$, $YF_3$, $CaF_2$, $Gd_2O_3$, $LaF_3$, $Y_2O_3$, $ZrO_2$, $Y_2O_2S$, $La_2O_2S$, $Y_2BaZnO_5$, or $Gd_2BaZnO_5$; and the dopant comprises about 5 mol % to about 30 mol % of $Yb^{3+}$ and about 1 mol % to about 3 mol % of one or more of the following: $Tm^{3+}$, $Ho^{3+}$, or $Er^{3+}$, each based on the total mole of the upconverting nanoparticle.

9. The method of claim 8, further comprising identifying, upon water breakthrough in the production well, the at least one of the plurality of injection wells that supplies the breakthrough water by qualitatively determining the presence of the upconverting nanoparticle in the production fluid.

10. The method of claim 9, further comprising shutting off the at least one identified injection well.

11. The method of claim 8, wherein the monochromatic wavelength is about 980 nm.

12. The method of claim 8, wherein the upconverting nanoparticle is surface modified with citric acid or the upconverting nanoparticle has the coating of a polyethylene glycol, a polyacrylic acid, a derivative thereof, or a combination comprising as least one of the foregoing.

13. The method of claim 8, wherein the upconverting nanoparticle is surface modified with citric acid.

* * * * *